United States Patent [19]

Roth et al.

[11] Patent Number: 4,457,347
[45] Date of Patent: Jul. 3, 1984

[54] DEVICE FOR WINDING COILS FOR ELECTRIC MOTORS

[75] Inventors: Wolfgang Roth, Nidderau; Karl-Heinz Fichtner, Hanauam Main; Dieter Febler, Bad Homburg, all of Fed. Rep. of Germany

[73] Assignee: Statomat-Globe Maschinenfabrik GmbH, Niederdorfelden, Fed. Rep. of Germany

[21] Appl. No.: 277,340

[22] Filed: Jun. 25, 1981
(Under 37 CFR 1.47)

[30] Foreign Application Priority Data

Jun. 27, 1980 [DE] Fed. Rep. of Germany ....... 3024219

[51] Int. Cl.$^3$ .............................................. B21F 3/00
[52] U.S. Cl. ................................................. 140/92.1
[58] Field of Search ..................... 140/92.1, 92.2, 92.9

[56] References Cited

U.S. PATENT DOCUMENTS 4,269,235  5/1981  Muskulus ........................... 140/92.1

Primary Examiner—Francis S. Husar
Assistant Examiner—Linda McLaughlin
Attorney, Agent, or Firm—Larson and Taylor

[57] ABSTRACT

A device for winding coils for electric motors is improved by simplifying the gripping element that holds and grips the wires. The device includes a winding template, a winding nozzle, a receiver for the coils, and the gripping element. In previous devices, the gripping element is moved in three dimensions, requiring a relatively complex system to control its motion. In the present invention, the gripping element is moved in two dimensions only which simplifies its construction and control, but without sacrificing any of its functions.

11 Claims, 5 Drawing Figures

DEVICE FOR WINDING COILS FOR ELECTRIC MOTORS

The invention relates to a device for winding coils or groups of coils for electric motors, comprising a winding template, a winding nozzle circulating relative thereto, a receiver with parallel-axis slits that can be brought into engagement with the template, a pusher for pushing coils from the template into the slits of the receiver that together with the winding nozzle is axially movable relative to the template, as well as a gripping element that can be moved axially and radially relative to the template by a controllable drive, said gripping element holding and guiding the wire between the coils or groups of coils and being movable between a gripping position adjacent to the halted winding nozzle and one or more winding-on positions that are assumed adjacent to the template in the beginning phase of the winding process.

Such a device is described in German OS No. 28 08 048 and in similar form in U.S. Pat. No. 3,967,658. It winds in both directions of rotation, and depending upon its application, it winds with different wire thicknesses on the same template. On occasion even the template may be exchanged. The receiver can comprise a transfer tool made as rods arranged in a ring that receives the coils of a stator and transfers them singly or collectively to a drawing tool. Alternatively however a drawing tool itself can serve as a receiver. The winding nozzle usually stops after each winding process at the same place in its trajectory. Depending upon whether the winding is done to the right or left, the wire thereby assumes a different position between the stopped winding nozzle and the template, so that the gripping element must also be moved to engage the wire in different positions of the winding plane that is radial with reference to the template. In addition there was the necessity for different winding-on positions of the gripping element because of the changing direction of the winding nozzle and the different lengths of wire connections between the coils to be pulled by the clamped gripping element. Finally, the gripping element also had to avoid the movements of the other tool parts. For this reason it was moved and controlled three-dimensionally, with the requirement for several controllable drives. The outlay was correspondingly high, and assembly and reequipment was complex and time consuming.

There are simplified gripping devices in German OS No. 28 08 050 and German AS No. 15 89 860. In both cases however, the gripping element clamps the wire in the region that, seen from above, is within the ring of rods of the receiver, which thus subsequently has to be drawn through the bore of the stator in the drawing-in process. This has the effect that in the coils in question there is one more wire in one stator notch than in the other, and this is often undesirable. To produce wire connections of different lengths beween the coils or coil groups in right-hand or left-hand winding, it is also known from German OS No. 28 08 050 that the winding nozzle can be allowed to stop in various places along its trajectory, and that the necessary length of wire can be produced by cooperation with a hook disposed on the template. In the case of German AS No. 15 89 860, the gripping element moves in a radial plane with reference to the template and only engages the wire after the coils have been pushed from the template and hang loosely in the receiver. There is some uncertainty involved here because the position of the wire is not as specific as it is in a taut state between the winding nozzle and the template. Moreover, the gripping element that moves only in a radial plane cannot be utilized to pull different lengths of wire for the inter-pole connections as required, from the winding nozzle.

The invention is intended to solve the problem of producing a winding apparatus of the type in question that will avoid the drawbacks that have been indicated, in that with a substantially simpler gripping element that can be readily controlled, the necessary clamping and guiding functions, including the drawing of inter-pole connections of varying length, can be executed.

The problem is solved according to the invention in that the winding nozzle can be halted in a plurality of defined angular positions along its path and the gripping element is movable only in a plane parallel to the longitudinal axis of the template that includes a gripping position and winding-on positions common to a number of halting positions of the winding nozzle.

The finding is exploited in the invention that it is possible to manage with a two-dimensionally movable gripping element to the extent that the winding nozzle can only be halted in various positions in right-hand and left-hand winding. The fixation of the said gripping element is adjustable e.g. by bolts on the machine frame in such a way that its plane of motion can be rapidly directed to the gripping position and the winding-on positions, depending upon the winding template that is used. To move the gripping element in the plane that encloses these positions, basically two drives are provided, e.g. one for the horizontal movement and one for the vertical. Use of a single drive is preferred, however, advantageously a rotary drive motor that cooperates with a drive, preferably a lever drive, that guides the gripping element on a trajectory. The trajectory at least in the region of the different winding-on positions and possibly also of the gripping position should be substantially straight. Such a trajectory, with an essentially straight curve [sic] zone can be attained for example with a crank or sliding block (see the textbook Getriebetechnik by Johannes Volmer, VEB Verlag Technik 1972, pp 67–68 and 77–78).

The concept of the invention can be applied in winding apparatus in which the gripping element is connected with the bearing of the winding nozzle and axially movable therewith, and also if the gripping element is borne with its drive and guide members independently of the winding nozzle, on the machine frame. Since in the former case there is no relative motion between the winding nozzle and the bearing of the gripping element, it is provided that the gripping element be movable by its own drive into the gripping position, while the wire that is to be engaged extends between the winding nozzle and the template. In the other case, the gripping element in the gripping position catches the wire that extends between the receiver and the winding nozzle during or after the pushing-off process. The wire retains its position well because the winding nozzle travels along in the pushing-off process. In the last mentioned variants there are different ways for drawing the wire by means of the gripping element from the winding nozzle for the inter-pole connections. When the gripping element holder moves axially with the nozzle, the wire is pulled out after, when the fixedly clamped gripping element moves out of the gripping position into the winding-on position. On the other hand, if the gripping element is borne on the machine frame, the arrangement is such that it holds the wire clamped in the gripping position while the winding nozzle is pulled back to the winding plane.

In order that the gripping element may perform its various functions, especially the holding of the wire during the first phase of a winding process and the pulling of inter-pole connections of different lengths, in a simple way, and differently according to the particular application, it is connected with a controlled closing drive that in specific positions and/or phases of its motion clamps the gripping element or holds the wire loosely enclosed or open.

The invention is discussed in more detail below with reference to a form of embodiment illustrated in the drawing.

Figure 1:
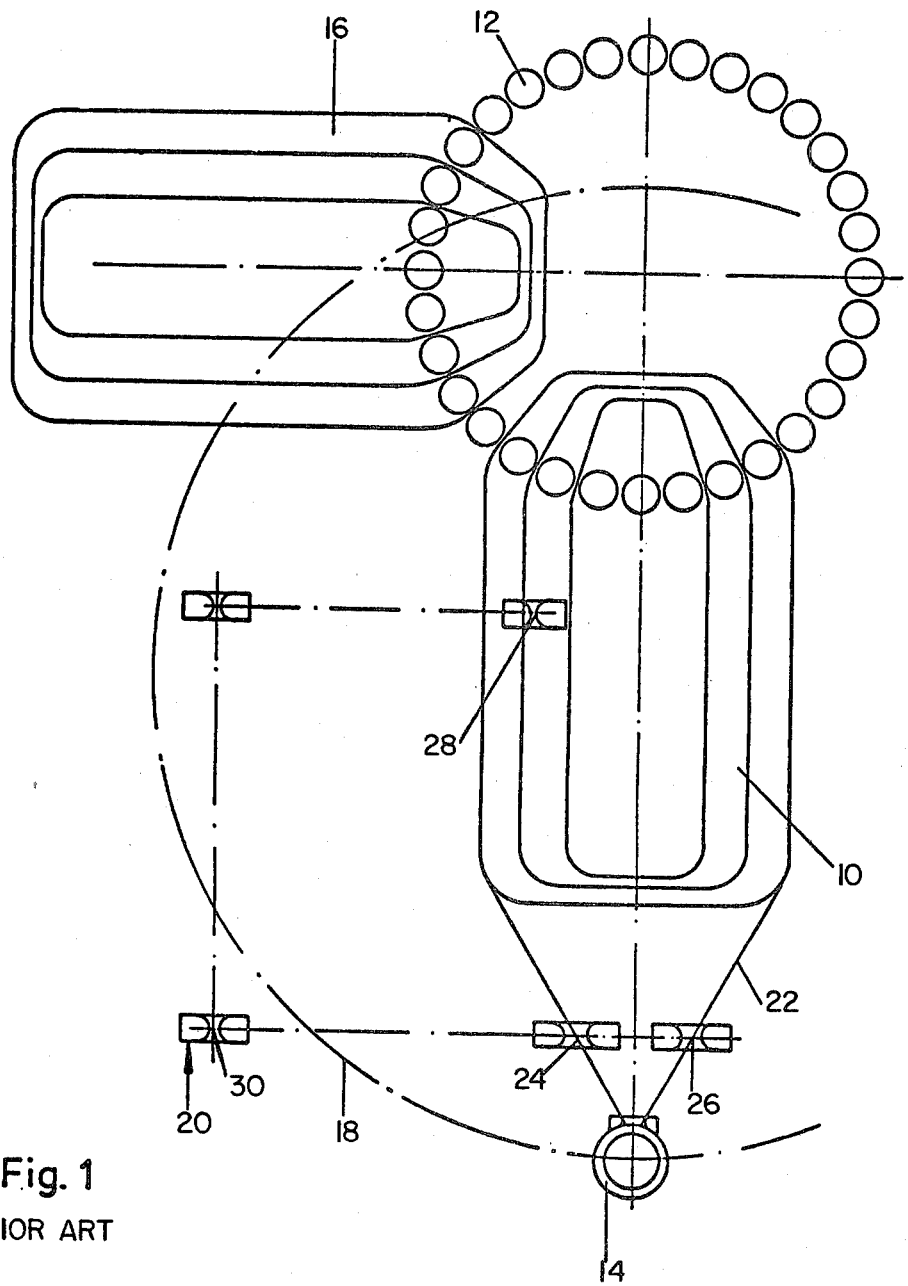
FIG. 1 is a simplified top view of a template, a receiver and the winding nozzle of a winding apparatus, where the intermediate positions, for the clamping device that were customary heretofore are indicated.

FIG. 1 shows in top view the projection of a template 10, a receiver 12 and a winding nozzle 14 of a winding apparatus. In addition a completely wound coil group 16 hanging in receiver 12 is shown. After the winding of this group 16 of coils, receiver 12 was moved along by 90° about its longitudinal axis before the start of the next winding process so that group 16 has been moved out of the position aligned with template 10 shown in FIG. 1. During the winding, winding nozzle 14 moves on a path 18. A gripping element 20, after the stopping of winding nozzle 14, e.g. at the place shown in FIG. 1, can engage the winding wire 22 that runs from the nozzle to template 10 and hold the wire loosely or clamped. The engaging of the winding wire after a winding process occurs, depending upon the left-hand or right-hand running of nozzle 14, in one of the two gripping positions 24 or 26. Normally heretofore the gripping element, after engaging winding wire 22 in one of the two gripping positions 24, 26 and after pushing off the last formed coil or group of coils on template 10, would travel into a winding-on position indicated by 28. There close under the winding plane and in the immediate vicinity of the template, the wire would be held clamped during the first phase of the next winding process, in order to wind as wanted on template 10. As soon as a few windings were produced on template 10, there would be enough friction so that it would no longer be necessary to hold wire 22 clamped. During the winding process the gripping element 20, for reasons of safety, was outside the path 18 of winding nozzle 14 in a waiting position indicated by the numeral 30. The opposite position of the changing positions 24, 26, 28, 30 reached by the gripping element in different radial planes with reference to template 10 and receiver 12 made a previously used three-dimensional guided and controlled gripping element necessary.

Figure 2:
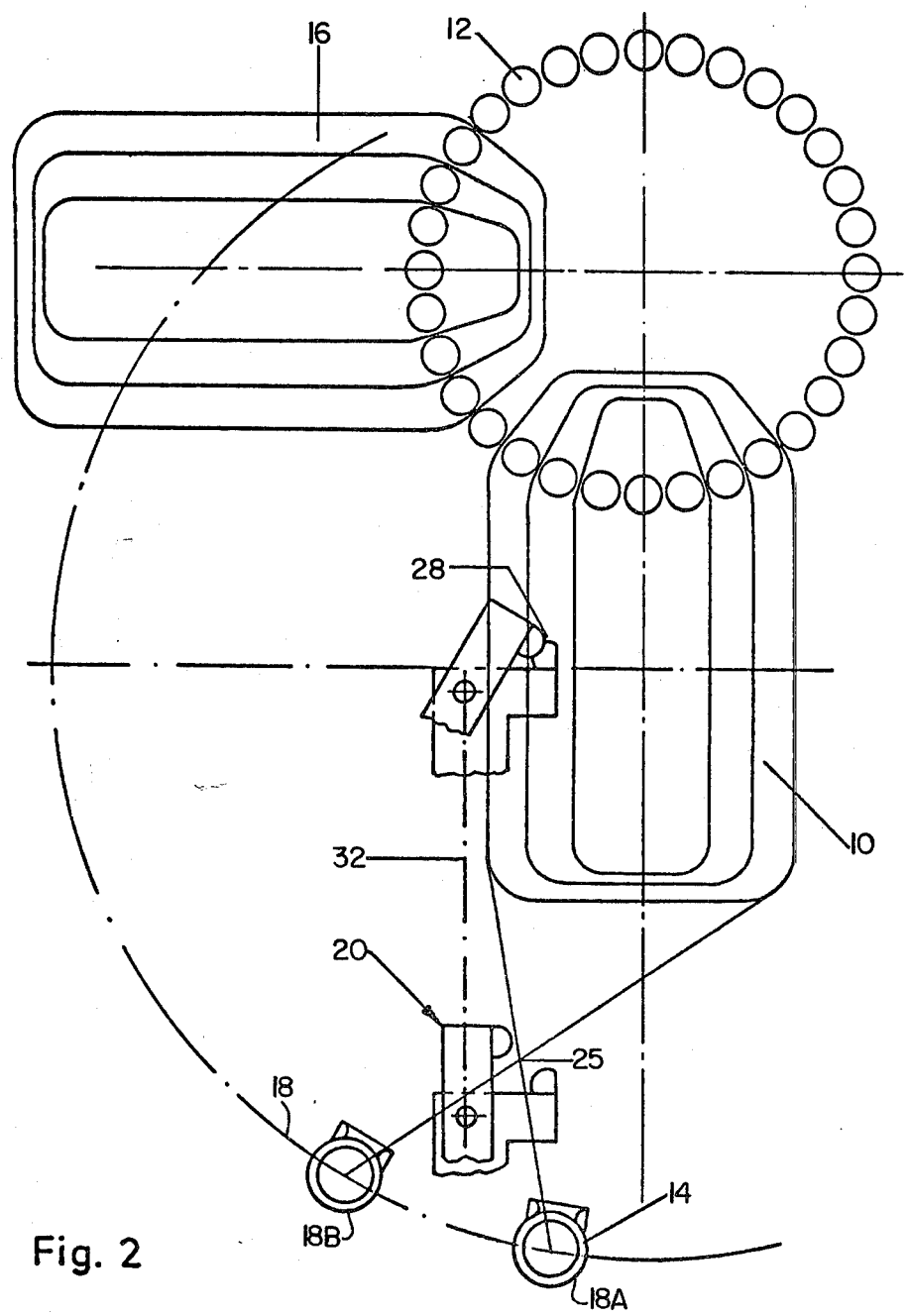
FIG. 2 is a view according to FIG. 1, but it shows the arrangement of parts according to the present invention.

FIG. 2 shows that a single gripping position 25 of gripping element 20 is sufficient, in the radial plane, to engage the winding wire 22 in any case, independently of the winding direction. The assumption is that the winding nozzle 14 will stop, after winding in one direction, at a first location 18A on its path 18, and after winding with the opposite direction of rotation it will stop at another location 18B on the trajectory. From gripping position 25, gripping element 20 can be moved into winding-on position 28 or into various winding-on positions, by movement in a single plane, indicated by a dot-and-dash line 32 through the pivot points of the clamping jaws in FIG. 2. For guiding and for the drive of gripping element 20, reference is made below to FIGS. 3 and 4.

Figure 3:
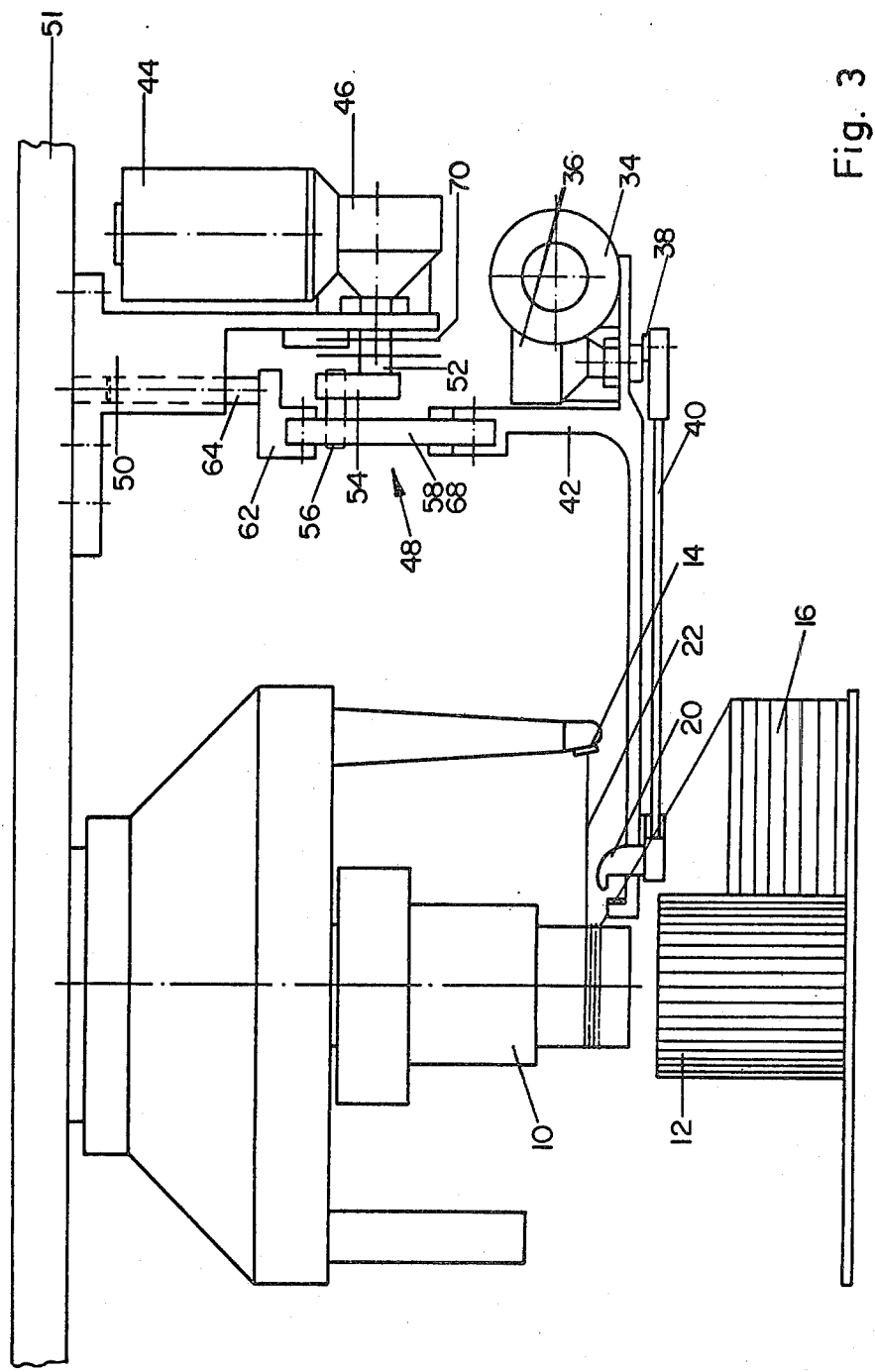
FIG. 3 is a side elevation view of the winding apparatus with a gripping element braced on the bearing of the winding nozzle.
Figure 4:
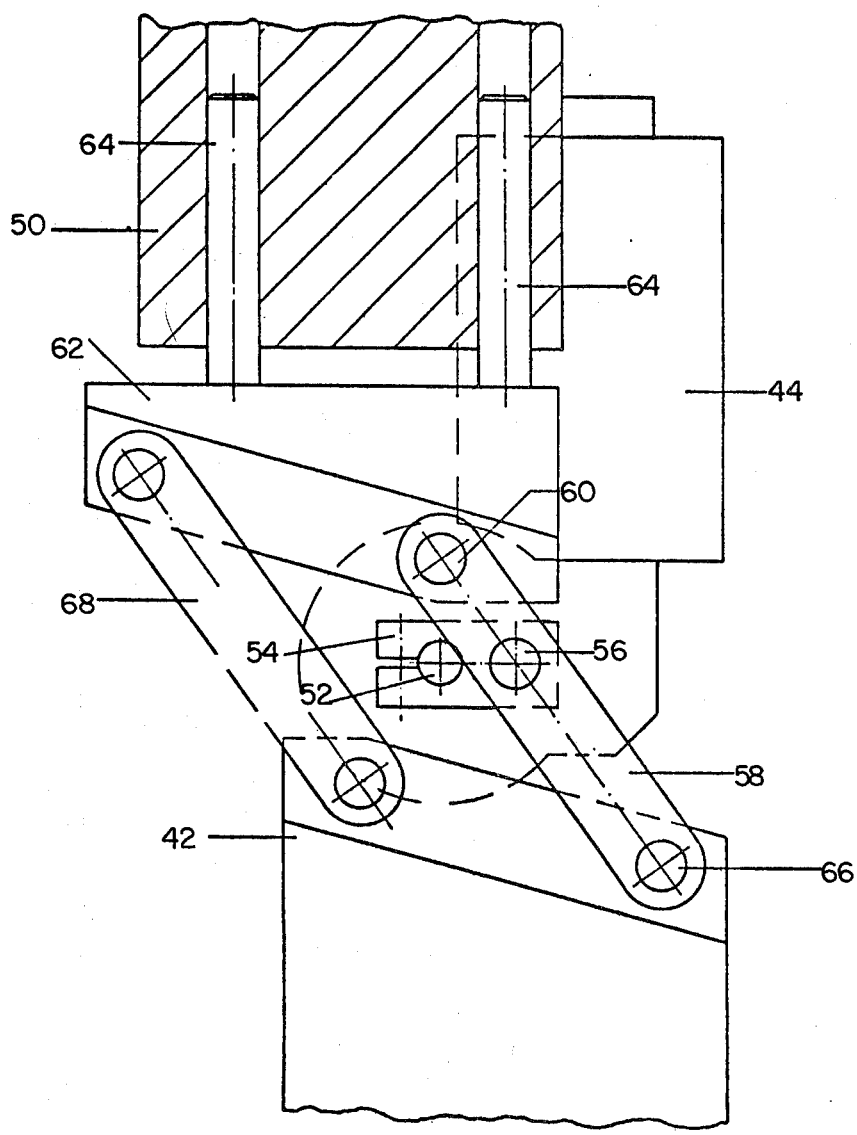
FIG. 4 is an enlarged side elevation view of the drive that guides the gripping element according to FIG. 3.

FIG. 3 shows the parts of the winding apparatus considered in conjunction with FIG. 2, in a side elevation view. At the same time, the drawing shows the guiding and actuation of gripping element 20. For its closing and opening movement, a drive motor 34 is provided, which acts by way of a gearing 36 and a crank pin 38 as well as by way of an operating rod 40 on the movable clamping jaw of the gripper 20. A rubber-elastic cushion may be inserted into the operating rod 40 or at least into one of the clamping jaws of the gripper 20 in order not to have to make any changes and to avoid any damage to the wire in the case of changing the thickness of wire.

The mouth of the gripper 20 and its closing motor are constructed and arranged and are controllable such that the gripper 20 may assume three different states: a closed or clamped position, a guide position in which the winding wire 22 is conducted loosely in the mouth of the hook forming a closed eye, and an opened position.

The gripper 20 and its drive motor 34 motor with gearing 36 are mounted on a supporting arm 42 which is moved by a rotary driving motor 44 by way of a miter-wheel gearing 46 as well as a lever gearing 48 altogether in such a way that the gripper 20 is moved in a single plane which lies transversely to the rotational axes of the lever gearing 48. The lever gearing 48 is mounted on a support 50, just like the driving motor 44, which support in turn is connected with the bearing 51 of the winding nozzle 14. In the case of the lever gearing 48, we are dealing with a crank of a breech mechanism, the construction of which is apparent from FIG. 4. There, the number 52 designates the driven shaft of the miter-wheel gearing 46 and number 54 designates a crank. The crank 54 rotating around the axis of the driven shaft 52 is connected with a slide 58 by way of a joint 56 which is mounted by way of a joint 60 on an intermediate part 62. The latter is guided in a straight line on the support 50 shiftable in a vertical direction by parallel guide rods 64. The rotational movement of the crank 54 is converted into a superposed linear and swivelling movement of the slide 58 and at the same time the outside end of the slide 58, designated with 66, describes a circular path correponding to the dotted curve I in FIG. 5. Since between the carrier 42 connected articulately with the forward end of the slide 58 and the intermediate part 62 another parallel guide 68 is disposed in parallel arrangement to the slide 58, the gripper 20 mounted on the bearing arm 42 also carries out a movement in a vertical plane according to the dotted curve I.

On shaft 52 there are seated slit plates 70 that serve as pulse transmitters for control of the drive motion of gripping element 20. This control is relatively simple and can be easily adjusted because both drive motor 44 and gripping element 20 execute a circulating motion.

The function of the gripping element is discussed in more detail below with reference to FIG. 5. After a coil or group of coils has been wound on template 10, the open gripping element moves on its path from a waiting position designated 72, upward into gripping position 25. There it engages the taut winding wire 22 that is stretched between template 10 and winding nozzle 14, independently of the direction in which the winding was done. Since holding device 50 is connected with the bearing 52 of winding nozzle 14, the relative position between the gripping element in gripping position 25 and winding nozzle 14 is unchanged in the subsequent pushing-off movement in which winding nozzle 14 together with the pusher that is not illustrated moves downward with reference to FIGS. 3 and 5. The movement of the gripping element 20 during the pushing-off process is not indicated in curve I of FIG. 5 for reasons of clarity. Only the path of the gripping element is shown that is produced while the winding nozzle 14 is in the winding plane.

After completion of the pushing-off process, winding nozzle 14 and gripping element 20 return to the winding plane, whereby the gripping element first is located again in the gripping position 25. Depending upon whether now additional wire is to be drawn from nozzle 14 or not, gripping element 20 moves clamped or half open in which the wire slides through the gripper jaw as through an eye, into the provided winding-on position 28, 28a or another winding-on position. Which of these positions is approached depends for example upon the direction of winding and the length of wire that is to be drawn from the winding nozzle 14 by means of the gripping element. The curve I produced by the crank should be as straight as possible in the region of winding-on positions 28, 28a and gripping 25, and lead somewhat downward from gripping station 25 on the winding plane, so that upon the approach of winding nozzle 14 the gripping element is below the plane of circulation. During the approach phase of winding nozzle 14, gripping element 20 holds the winding wire 22 at the selected winding-on position 28 or 28a, firmly clamped in either case. After several windings have been produced on the template 10 and the wire now because of its friction on the template can accept the tension exerted by winding nozzle 14, gripping element 20 opens and returns in the direction of the arrow along the curve to waiting position 72.

Alternatively to the above described arrangement, a holding device 50 could be disposed on the machine frame instead of on the bearing 51 of winding nozzle 14, so that the gripping element, in distinction to the first described embodiment, does not participate in the pushing-off movement in which the winding nozzle 14 takes part. A trajectory for this latter embodiment of gripping element that once again is moved in a single vertical plane is designated II in FIG. 5. The lever drive in this case can be for example a slide block as described in the bibliographical citation above. The way of function differs essentially from the first described function in that the gripping element does not engage the winding wire 22 in the winding plane, but remains open in its waiting position designated 25' and then in the course of the pushing-off movement engages the winding wire that is taken downward by winding nozzle 14 and the pusher. The waiting position 25' thus is also the gripping position. Depending upon whether the gripping element is to pull an additional length of wire from the winding nozzle 14 or not, gripping element 20 is held clamped or half open during the return of winding nozzle 14 to the winding plane: the wire can slide through the gripping jaws. Thereafter gripping element 20 moves out from position 25' into the provided winding-on position 28 or 28a and there as described above holds the wire clamped during the initial phase of the winding process and then returns in the direction of the arrow to waiting position 25'.

Thus far it has only been stated that the wire connections between the coils can be lengthened with the new apparatus. A shortening is likewise possible, however. For this, the process would be as follows, with reference to FIG. 2.

After the pushing off, receiver 12 turns by a specific angular step and thereby the pushed off coil or group of coils assumes the position shown in FIG. 2. Assuming that winding nozzle 14 has run clockwise with reference to FIG. 2, in the new position of the coil or group of coils 16 there is now a loose wire connection to gripping element 20 and winding nozzle 14. If however the gripping element 20 is thereupon switched over into the half open position and winding nozzle 14 moves back a specific length on its path 18, the wire becomes taut again and if desired wire can also be drawn back from the wound coil or group of coils 16 through the half open gripping element 20.

Figure 5:
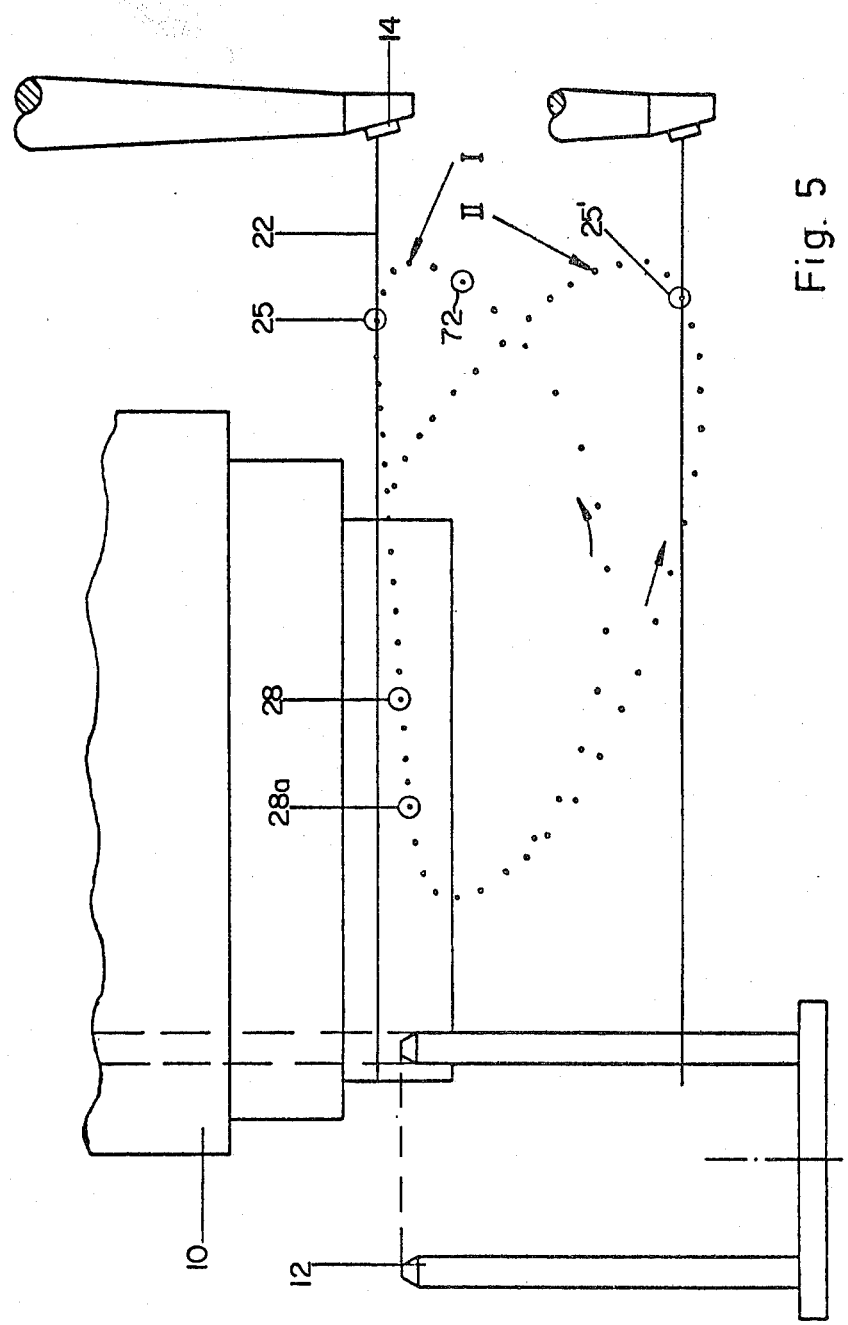
FIG. 5 is a side elevation view showing the trajectory of the gripping element of two different winding apparatus according to the invention.

There is alternatively the possibility, after the pushing off and moving on of receiver 12 to proceed with the half open gripping element 20 with reference to FIG. 5 out of gripping position 25 into the winding-on position, whereby the wire slips through the half open gripping element.

It is obvious that aside from the mentioned guide drives for gripping element 20 there are other kinds of drives available to the specialist. What is important is only that the gripping element be movable by the simplest possible drive in a single plane between the various positions necessary for execution of a function.

Means for stopping nozzle 14 in predetermined positions 18 and 18A are known per se, e.g. from U.S. Pat. No. 3,973,601.

We claim:

1. In a device for winding coils or groups of coils for electric motors, comprising a winding template, a winding nozzle located adjacent said template and movable in a winding path circularly relative thereto for winding a wire moved through said nozzle onto said winding template, a receiver located below said template and comprising parallel-axis slits movable into engagement with the template, a gripping element mounted laterally of said template and axially and radially movable relative to the template, said gripping element including means for holding and gripping a wire between coils or between groups of coils, the said gripping element being movable between a gripping position adjacent to the winding nozzle when relative circular motion of the winding means is stopped and at least one winding position assumed in a beginning phase of a winding process, said winding position being adjacent to the template: the improvement wherein said gripping element is movable only in a plane that is essentially parallel to the longitudinal axis of said template, said gripping element being movable in said plane between a winding-on position adjacent said template and a gripping position, and wherein said device comprises means operatively connected to said winding nozzle for stopping said winding nozzle in a plurality of defined stopping positions in its winding path, said gripping position of said gripping element being common to said plurality of defined stopping positions whereby, when said winding nozzle is positioned in any of said plurality of pre-determined stopping positions, said gripping element, when moved into said gripping position, is positioned to engage a wire extending between said winding nozzle and said winding template.

2. Device as in claim 1, wherein the gripping element is movable in its plane of motion in a circulating trajector.

3. Device as in claim 2, wherein the gripping element is movable by a rotary drive via a lever drive.

4. Device as in claim 3, wherein the lever drive comprises a crank mechanism.

5. Device as in any one of claims 1 to 4, wherein said winding nozzle comprises a bearing and wherein the gripping element is connected with the bearing of the winding nozzle and is axially movable therewith, whereby the gripping element is movable in said plane while a wire that is to be engaged by said gripping element extends between the winding nozzle and the template.

6. Device as in any one of claims 1 to 4, wherein said device comprises a frame, wherein the gripping element is mounted on said frame, and wherein said device further comprises means for moving the gripping element in said plane into a position in which it catches a wire extending between the receiver and the winding nozzle during or after transfer of a coil or group of coils from said template to said receiver.

7. Device as in any one of claims 1-4 further comprising controlled closing drive means connected to said gripping element for clamping said gripping element onto a wire and for holding a wire loosely while enclosing it, or while open.

8. Device as in claim 5 further comprising means connected to said gripping element for moving said gripping element in said plane in a clamped state, out of the gripping position into the winding-on position to extend the wire connection between successive wound coils or groups of coils.

9. Device as in claim 1, wherein said gripping element comprises a plurality of clamping jaws and wherein at least one clamping jaw of the gripping element is provided with an elastic intermediate part.

10. Device as in claim 7 further comprising means for adjustably fixing said gripping element and said closing drive for changing the position of the plane of motion of said gripping element.

11. Device as in claim 3 wherein the lever drive comprises a slide block.

* * * * *